Figure 1:
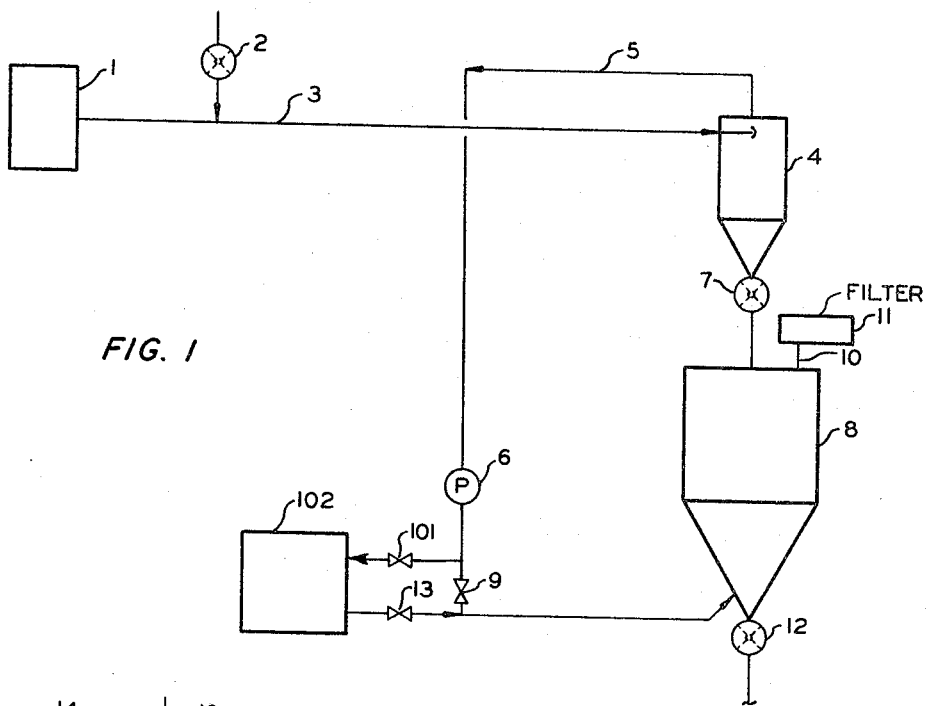
Figure 2:
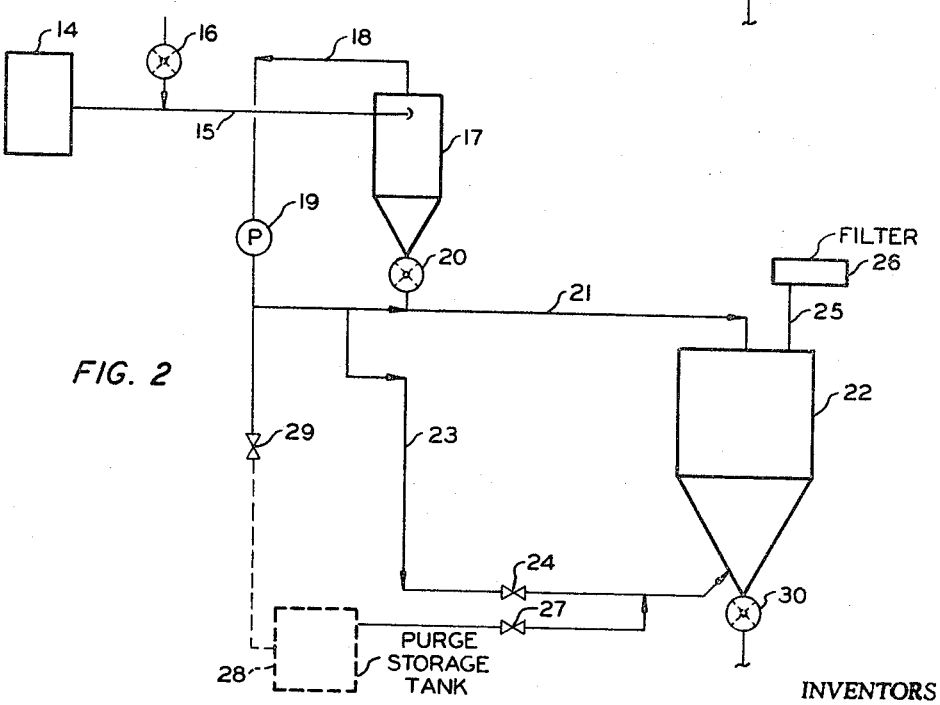

March 28, 1967    F. T. BARBER ETAL    3,310,882
SOLIDS TRANSFER AND STORAGE SYSTEM
Filed Nov. 20, 1964

INVENTORS
F. T. BARBER
W. J. WRIDE
BY
*Young, Bugg*
ATTORNEYS

United States Patent Office 3,310,882
Patented Mar. 28, 1967

3,310,882
SOLIDS TRANSFER AND STORAGE SYSTEM
Franklin Taylor Barber, Madrid, Spain, and William James Wride, Bartlesville, Okla., assignors to Phillips Petroleum Company, a corporation of Delaware
Filed Nov. 20, 1964, Ser. No. 412,810
5 Claims. (Cl. 34—10)

This invention relates to the transportation and storage of solid materials.

In one of its aspects, the invention relates to the conveying of solids containing combustible materials with gas to a storage zone and utilizing the carrier gas to purge the storage zone of combustible materials to prevent explosion. In another of its aspects, this invention relates to conveying solids containing combustible materials to a gas-solids separator with gas, separating the gas from the solids, and then using a portion of the gas to convey the separated solids to a storage zone, and using another portion of the separated gas to purge the storage zone.

Various solids, including solid polymers of olefins, have residual volatiles or combustible materials from the manufacturing process included with them. Often these volatiles are flammable and explosive materials. When the solids are stored in a bin or a tank for a period of time, these explosive materials will diffuse from the solid and build up explosive mixtures in the bin or tank atmosphere. A known way to circumvent this problem is to continuously purge the bin or tank into which the solid has been introduced with gas to remove the volatile gases. This serves to hold the volatile level of the gases below the minimum explosive limit. This purge gas is usually taken from an independent supply of purge gas and introduced directly to the tank or bin. This individual supply of purge gas has, however, resulted in considerable expense and inconvenience due to the necessity of added storage tanks for the gas and additional piping costs.

We have now discovered a method whereby the cost of the additional gas and the storage tank and piping costs can be reduced by utilizing the transportation gas as the purge gas to remove the combustible materials from the stored solid.

An object of this invention is to provide a method whereby a combustible material can be removed from a stored solid.

Another object of this invention is to reduce the cost of transportation and purge gases used in the storage of solids.

A still further object of this invention is to economically eliminate the safety hazards heretofore known in the storage of solids containing combustible materials.

Other aspects, objects and the several advantages of this invention are apparent from a study of this disclosure, the drawing and the appended claims.

In accordance with this invention, a solid containing combustible materials, e.g., a hydrocarbon solvent, is entrained in transportation gas. This transportation gas is passed to a zone where gas-solid separation is effected and the transportation gas is removed from the solid. The transportation gas thus removed is pressurized by suitable means and recontacted with the separated solid to purge the combustible therefrom. This recontact can be made by way of countercurrent gas-solid contact or by inserting the gas into the bottom of a solids storage tank or bin whereby the gas merely passes through the collected solids. The gas, which then contains the combustible material, is then passed from the bin or storage tank and disposed of by any one of a number of suitable methods.

In another method according to the practice of this invention, a solid which contains a combustible material, e.g., residual solvent, can be entrained in gas and passed to a cyclone, or gas-solid separation zone which will effect the separation of the gas from the solid. The gas is then passed to a suitable pressurizing means such as a blower and divided into two separate streams. One of the streams is used to convey the solid, which was separated in the gas-solid separation zone, to the top of a storage bin. The other stream is directed to the bottom of the storage bin where it is passed through the solid to effect the removal of the residual solvents therefrom. The gas which has removed the residual solvents may be purified following the removal of the solvents from the solid, and reused in the process.

The method of purging residual solvent from solids as hereinbefore described is suitable for solid polymers. It has been found particularly suitable for a solid polyolefin. Such polymer can be in a dry powder form or can be in a coagulated pellet form or any other suitable form in which it is made during production.

The residual solvents which are purged from the polymer are those which are used during the polymerization and subsequent operations on the polymer. Examples of such solvents are pentane, n-heptane, and methylcyclopentane. Although these solvents have been given by way of example, many other suitable solvents which are frequently used in polymerization processes can be removed in accordance with the process of this invention.

The gas used in the process of this invention is one which will not cause additional reaction or oxidation of the solid polymer during the various transportation and purging steps. Suitable gases which can be used in the method of this invention include, but are not limited to, nitrogen, argon, helium, and air. Carbon dioxide and/or clean, dry combustion flue gas can also be used.

The portion of the gas which is introduced to the bottom of the storage bin or tank is controlled in such a manner as to render the volume of residual solvent in the atmosphere above the stored solid below the explosive range. For example, if a polymer containing about 0.033 weight percent of n-pentane were stored in a closed tank containing 50 percent void space, the concentration of pentane vapor in the void space, prior to the purging of the tank, would rise from 0 to about 10 volume percent. Since the explosive range for pentane and air is 1.45 to 7.5 volume percent, it can be seen that a potential safety hazard would exist. In actual practice, the pentane content of the polymer entering the transport system is frequently in the range of 0.1 to 0.5 weight percent, thereby requiring a greater volume of purge gas to reduce the concentration of pentane vapor in the void space below 1.45 volume percent to eliminate the explosive hazard.

A better understanding of the invention will be had with reference to the accompanying drawings in which FIGURE I is a schematic view of a solid polymer transportation-and-purging system of this invention, and FIGURE II is an alternate method for the transportation and purging of solid polymer in accordance with this invention.

Referring now to FIGURE I, the gas is introduced to the transportation-and-purging system by gas introduction or storage means 1. Solid, dried polymer containing residual solvent is introduced through star valve 2 into the gas stream in conduit 3. The dried solid polymer containing the residual solvent is pneumatically conveyed with the gas through conduit 3 to gas-solid separator means 4, which can preferably be a cyclone. The gas separated in the gas-solid separator means 4 is passed through conduit 5 to blower 6. The solid polymer containing the residual solvent passes by gravity through star valve 7 to storage bin or tank 8. The gas which has been separated by cyclone 4 is circulated through blower 6 and valve 9 and introduced at the bottom of storage bin 8. The gas then passes through the solid bed of polymer which has been deposited in storage tank 8 and is removed through conduit 10 and filter 11. The dried solid polymer from which the residual solvent has been removed can be removed from storage bin 8 through star valve 12.

If additional purging gas is required, it can be introduced to the bottom of storage tank 8 through valve 13. If desired, pressurized gas from blower 6 can be stored in tank 102 by opening valve 101.

In FIGURE II gas is supplied to the transport-and-purging system from gas introduction or storage means 14. Dried solid polymer containing some residual solvent is introduced to the gas stream in conduit 15 through star valve 16 and transported to gas-solid separating unit 17, wherein gas is removed through conduit 18 and transported to blower 19. Solid polymer is removed from gas-solid separator means 17 through star valve 20. Recycled gas coming from blower 19 is used to convey the polymer from star valve 20 in conduit 21 to the top of storage tank 22. A separate stream of recycled gas is routed through conduit 23 and valve 24 to the bottom of storage tank 22 where it contacts the solid polymer. The gas containing the removed residual solvent is removed from the storage bin through conduit 25 and through filter 26. If additional gas is desired, it can be introduced into conduit 23 through valve 27. Gas from blower 19 can also be stored in tank 28 by opening valve 29. The solid polymer can be removed from storage tank 22 through star valve 30.

It is believed that modifications and changes in the apparatus shown in the schematic drawings can be made as desired by those skilled in the art. For example, blowers 6 and 19 could be other suitable apparatus which would develop sufficient pressure to move the gas. Although filters 11 and 26 have been shown through which the gas containing the residual solvent is removed, various gas-purifying devices can be utilized whereby the residual solvent can be removed from the gas and the gas returned to the gas source or storage areas 1 and 14 through means which are not shown. Although storage tanks 8 and 22 have been shown, these elements can be substituted with suitable countercurrent solid-gas contacting apparatus. These and other modifications are considered within the skill of the art.

The process of this invention can be operated either as a batch or as a continuous process.

*Specific example*

In order to test the efficiency of the removal of residual solvent from stored dried solid polymers, a polymer containing 0.033 weight percent n-pentane is transported through the system essentially as described in FIGURE II. The purge gas, which can be air, from blower 19 is stored in purge storage tank 28 which is controlled by valve 29.

After the tank is filled to a half-way mark with polymer, the operation is stopped and periodic checks on the concentration of pentane vapor in the void space are made. It is found that from the time of introduction of the solid polymer in the storage tank to the time of the final measurement, the concentration of pentane in the void space rises from 0 to about 10 volume percent. The purge gas stored in storage tank 28 is then introduced into the bottom of storage tank 22 and allowed to contact the solid polymer containing the residual solvent. After a short period of time, the concentration of pentane vapor in the void space is reduced from about 10 volume percent to less than 1.45 volume percent. Since the explosive range for pentane and air is in the range of 1.45 to 7.5 volume percent, the removal of pentane vapor in the void space by the purge gas is considered to be effective to reduce safety hazards.

The term "residual solvent" as used heretofore is only exemplary of the combustible materials that can be removed in accordance with the practice of this invention and is not used by way of limitation thereof. For example, the method of the invention could be used to remove "fines" or "coal dust" from coal, or dust from various agricultural products, such as grains. Other materials which can be utilized in the practice of the invention will be apparent to one skilled in the art.

Reasonable variation and modification are possible within the scope of the foregoing disclosure, the drawing and the appended claims to the invention, the essence of which is that there has been provided a method and apparatus for the transportation of a solid containing combustible materials and the removal of the combustible materials from the solid utilizing the same gas to transport the solid and remove the combustible materials therefrom.

We claim:

1. A method of transporting a solid and removing combustible material therefrom comprising transporting the solid in a gas stream, separating said gas stream from said solid, dividing said separated gas stream into a first and a second portion, transporting said separated solid pneumatically with said first portion, depositing said transported solid in a storage zone and purging said solid of said combustible material with said second portion of the divided gas stream whereby the combustible material is removed.

2. A method of transporting solid polymer and removing residual solvent therefrom comprising introducing a polymer containing from about 0.1 to about 0.5 weight percent solvent in gas, pneumatically conveying said polymer using said gas, separating said gas from said polymer, transporting said polymer to a storage zone, pressurizing said gas, passing said gas through said polymer deposited in said storage zone to purge said polymer of residual solvent whereby the explosive volume of the solvent in the storage bin is reduced below 1.45 volume percent.

3. A method of claim 2 wherein said polymer is a polyolefin, and said solvent is n-pentane.

4. A method of transporating solid polymer and removing volatile material therefrom comprising introducing the polymer containing absorbed volatile material in gas, pneumatically conveying said polymer using said gas, separating said gas from said polymer, transporting said polymer to a storage zone, passing said separated gas through the polymer deposited in said storage zone to purge said polymer of said volatile material.

5. Apparatus for transporating and storing a solid comprising, in combination, a pneumatic transport conduit terminating in a gas-solid separator, storage means adapted to receive separated solids from said separator, a blower adapted to receive separated gas from said separator and deliver one portion of said separated gas to a conduit communicating with the solids receiving portion of said separator and with said storage means, whereby said gas pneumatically transports said separated solids to said storage means, and to deliver another portion of said separated gas to a gas inlet in said storage means, and a gas outlet in said storage means oppositely disposed from said inlet whereby said gas flows through said separated solids in said storage means.

References Cited by the Examiner

UNITED STATES PATENTS

| | | | |
|---|---|---|---|
| 1,933,111 | 10/1933 | Hardinge | 34—57 |
| 2,622,341 | 12/1952 | Finnegan | 34—57 |
| 2,800,432 | 7/1957 | Weinrich | 302—53 X |

DONLEY J. STOCKING, *Primary Examiner.*

FREDERICK L. MATTESON, JR., JAMES W. WESTHAVER, *Examiners.*

D. A. TAMBURRO, *Assistant Examiner.*